United States Patent [19]

Freyermuth

[11] 4,075,901
[45] Feb. 28, 1978

[54] VARIABLE SPEED FRICTION TRANSMISSION

[75] Inventor: William J. Freyermuth, Rochester, Mich.

[73] Assignee: General Motors Corporation, Detroit, Mich.

[21] Appl. No.: 765,352

[22] Filed: Feb. 3, 1977

[51] Int. Cl.² ............................ F16H 7/00; F16H 15/00; F16H 7/10
[52] U.S. Cl. ................................... 74/226; 74/190; 74/242.15 R
[58] Field of Search .......... 74/190, 203, 226, 242.1 R, 74/242.15 R

[56] References Cited
U.S. PATENT DOCUMENTS

| 716,520 | 12/1902 | Cole | 74/226 X |
|---|---|---|---|
| 3,864,986 | 2/1975 | Bochan | 74/226 |
| 4,019,397 | 4/1977 | Bochan | 74/227 |

*Primary Examiner*—Leonard H. Gerin
*Attorney, Agent, or Firm*—John P. Moran

[57] ABSTRACT

A transmission including a cylindrical drive pulley, a cylindrical driven pulley, an endless belt of a suitable material and a predetermined uniform thickness, the belt being frictionally confined between the drive and driven pulleys and loosely encompassing one of the pulleys, an inner pair of cylindrical positioning pulleys mounted within the endless belt on opposite sides of the encompassed pulley, an outer pair of cylindrical positioning pulleys mounted on the outside of said endless belt on opposite sides of the other pulley, each of the inner and outer pairs of positioning pulleys frictionally confining the endless belt, and means for moving the pairs of positioning pulleys inwardly or outwardly with respect to the interior of the endless belt so as to cause the endless belt to bend partially around one of the drive and driven pulleys such that the inner and outer surfaces of the belt become respectively alternately shortened and lengthened therearound, to thereby serve as an extension of the radius of the partially surrounded pulley for infinitely varying the resultant speed ratio between the drive and driven pulleys within predetermined limits.

4 Claims, 7 Drawing Figures

VARIABLE SPEED FRICTION TRANSMISSION

This invention relates generally to a transmission and, more particularly, to continuously variable transmissions.

An object of the invention is to provide an improved, simplified, economical, and efficient continuously variable transmission.

Another object of the invention is to provide a continuously variable transmission including parallel, spaced driving and driven pulleys or wheels, and means associated with the belt for causing the belt to bend partially around one of the driving and driven pulleys such that the inner surface of the belt in contact with the partially surrounded pulley is shortened while the outer surface of the belt is lengthened, the belt thus serving as an extension of the radius of the partially surrounded pulley for varying the speed ratio between the drive and driven pulleys within predetermined limits.

A further object of the invention is to provide a continuously variable transmission including a cylindrical drive pulley, a cylindrical driven pulley, an endless belt of a suitable material and a predetermined uniform thickness, the belt being frictionally confined between the drive and driven pulleys and loosely encompassing the drive pulley, an inner pair of cylindrical positioning pulleys mounted within the endless belt on opposite sides of the drive pulley, an outer pair of cylindrical positioning pulleys mounted on the outside of the endless belt on opposite sides of the driven pulley, each of the inner and outer pairs of positioning pulleys frictionally confining the endless belt, linkage means connected between and rotatably supporting respective oppositely disposed inner and outer positioning pulleys for retaining the line between the centers thereof perpendicular to the adjacent inner and outer surfaces of the endless belt during all operational positions thereof, and actuating means pivotally supporting the linkage means for selectively moving the pairs of positioning pulleys inwardly or outwardly with respect to the interior of the endless belt so as to cause the endless belt to bend partially around one of said drive and driven pulleys such that the inner and outer surfaces of the belt become respectively alternately shortened and lengthened to thereby serve as an extension of the radius of the partially surrounded pulley for infinitely varying the resultant speed ratio between the drive and driven pulleys within predetermined limits.

These and other objects and advantages of the invention will be apparent when reference is made to the following description and accompanying drawings, wherein:

FIGS. 1-3 are schematic drawings of the inventive transmission in different operational positions;

FIGS. 4 and 5 are cross sectional views taken along the planes of the lines 4—4 and 5—5, respectively, of FIG. 2, and looking in the direction of the arrows;

Figure 1:
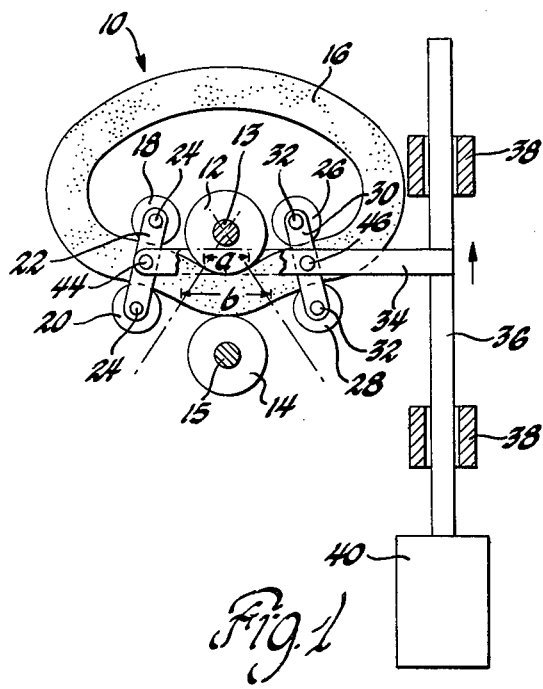
Figure 2:
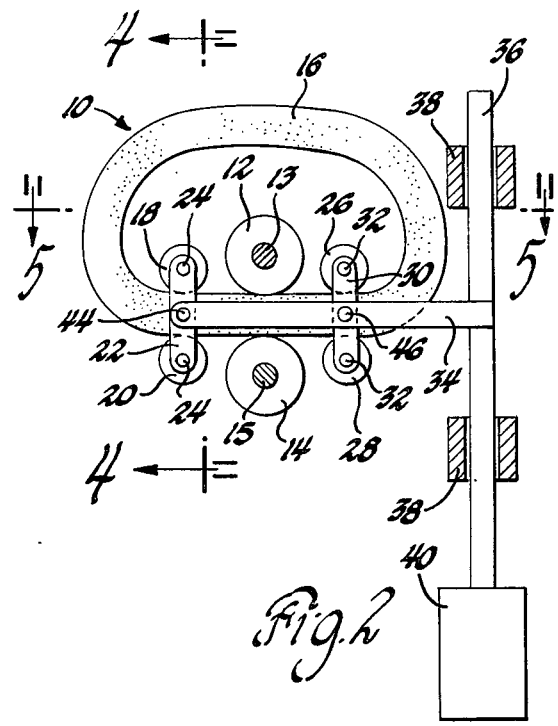
Figure 3:
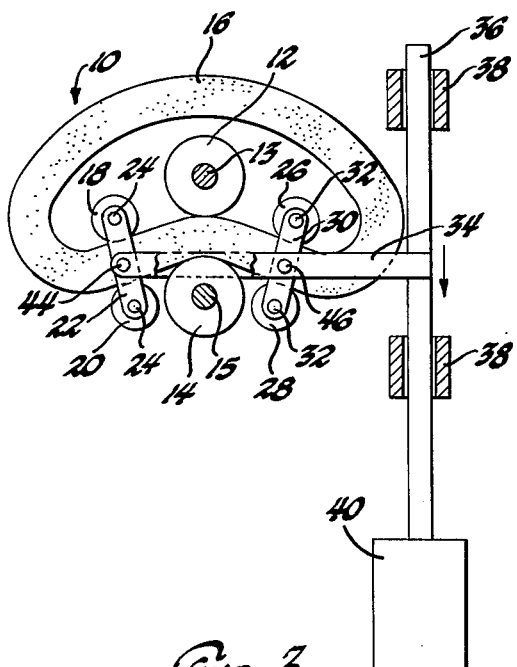
Figure 4:
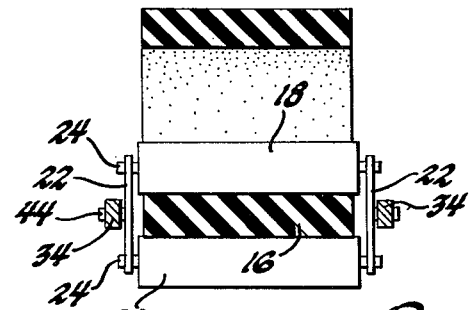

Referring now to the drawings in greater detail, FIGS. 1-3 illustrate a transmission arrangement 10 including a cylindrical drive pulley 12 on a drive shaft 13 and a cylindrical driven pulley 14 on a driven shaft 15 frictionally confining an endless belt 16 therebetween of a predetermined thickness, the endless belt 16 loosely encompassing the drive pulley 12. A first set of cylindrical positioning wheels or pulleys 18 and 20 is located on opposite sides of the endless belt 16 on one side of the drive and driven pulleys 12 and 14. As better noted in FIG. 4, a first set of spaced, parallel linkage members 22 are connected adjacent their respective ends to center pins 24 of the first set of positioning pulleys 18 and 20, so as to rotatably support such pulleys a distance apart sufficient to frictionally confine the endless belt 16 between the pulleys.

A second set of cylindrical positioning wheels or pulleys 26 and 28 are located on opposite sides of the endless belt 16 on the other side of the drive and driven pulleys 12 and 14. A second set of spaced linkage members 30 are connected adjacent their respective ends to center pins 32 of the second set of positioning pulleys 26 and 28 so as to rotatably support such pulleys the same distance apart as is the case with the first set of positioning pulleys 18 and 20, for frictionally confining the endless belt 16 therebetween.

Figure 5:
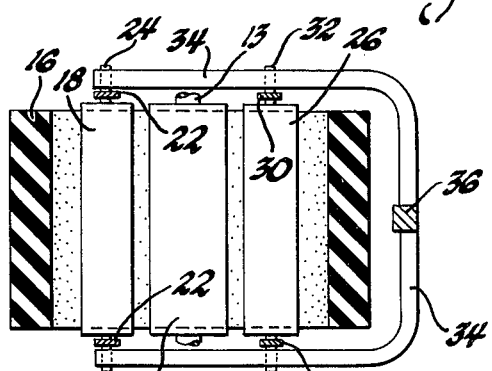

A U-shaped actuating lever 34 (FIG. 5) is secured to a yoke 36 intermediate two sets of bearings 38 (FIGS. 1-3) which slidably support the yoke 36. A suitable operator-controlled actuating mechanism, represented at 40, is formed on an end of the yoke 36 for selectively controlling the motion of the yoke 36. The mechanism 40 may, for example, consist of a piston and cylinder arrangement, a screw drive device, or other suitable manual means or automatic sensing device. Spaced pairs of pivot pins 44 and 46 are mounted on and adjacent the distal ends of the lever 34 for pivotally supporting the respective linkage members 22 and 30 at the respective midpoints thereof (FIGS. 1-3).

It is essential to the invention that the endless belt 16 be formed of an elastomeric or other suitable material, such as a flexible linked rigid material, either of which is capable, when curved around a pulley such as the pulley 12 or 14, of being lengthened along the outer or driving surface thereof while being shortened along the inner or driven surface thereof, the center length remaining constant. Hence, assuming, for purposes of illustration, a belt thickness of 1 unit and a radius for each of the drive and driven pulleys of 1 unit, when the yoke 36 is moved upwardly (FIG. 1), the belt 16 is caused to bend partially around the drive pulley 12 by the upward action of the positioning wheels 20 and 28.

More specifically, inasmuch as the respective sets of positioning wheels 18 and 20, and 26 and 28 are spaced so as to frictionally confine the belt 16 therebetween and the linkage members 22 and 30 are pivotally mounted on the actuating member 34, it has been determined that, during upward movement, the linkage members 22 and 30 remain substantially perpendicular to the belt 16, causing the above-mentioned bending condition of the belt 16 around the drive pulley 12, and resulting in the shortening of the inner contacting surface of the belt and extension of the opposite outer surface of the belt. The result of this condition is that the belt becomes effectively an extension of the drive pulley 12, the maximum effective driving radius now being two units, i.e., the one unit radius of the driving pulley 12 plus the one unit of thickness of the belt 16, whereas the driven radius of the driven pulley 14 is, of course, one unit. The resultant maximum drive ratio is therefor 1:2. This is illustrated in FIG. 1, where the length of the arc $a$ through which the compressed inner surface of the belt 16 is in contact with the drive pulley 12 is seen as being substantially one-half of the length of the arc *b* along the stretched outer surface of the belt 16, as encompassed by lines drawn from the center of the drive pulley 12 through the respective ends of the arc *a*. Hence, the outer surface is moving twice as fast as the inner surface, thus causing the driven pulley 14 to rotate at twice the speed of the driving pulley 12.

It should be realized that between the line contact of the drive pulley 12 on the belt 16, as shown in FIG. 2 and depicting a 1:1 drive ratio, and the 1:2 ratio arc length a arrangement of FIG. 1 just described, the intersection of the lines encompassing the varying arc lengths *a* and *b* progressively changes from infinity (above the drive pulley in FIG. 1) to the center of the drive pulley 12, as shown in FIG. 1, and, accordingly, the drive ratio varies continuously as the difference between the lengths of the shortened inner surface and the lengthened outer surface of the belt 16 progressively increases.

Moving the yoke 36 downwardly in the drawings, through the 1:1 drive ratio arrangement of FIG. 2, to the arrangement shown in FIG. 3, results in the belt 16 becoming effectively an extension of the driven pulley 14 by virtue of the shortening of the now reversed outer surface of the belt and the lengthening of the now reversed inner surface thereof. As with the FIG. 1 operational position, enroute to the 2:1 ratio position, the drive ratio is continuously varied from 1:1 to 2:1 as the difference between the lengthened inner surface and the shortened outer surface of the belt 16 progressively increases.

Figure 6:
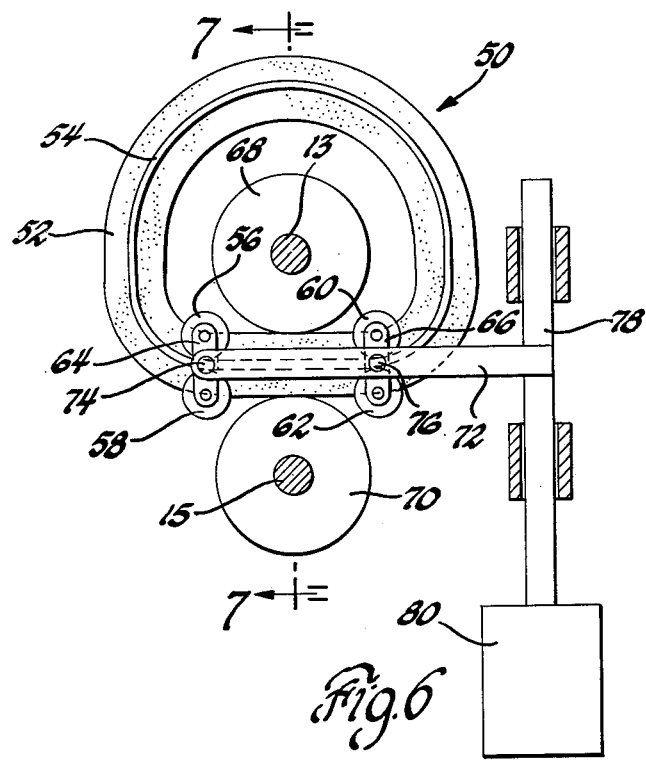
FIG. 6 is a schematic drawing of an alternate embodiment of the invention.
Figure 7:
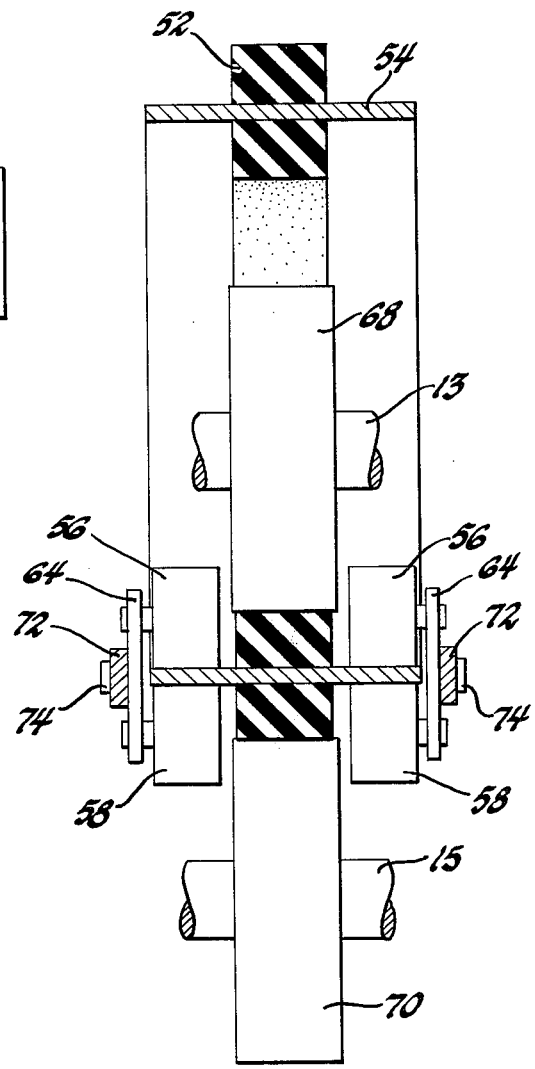
FIG. 7 is an enlarged cross sectional view taken along the plane of the line 7—7 of FIG. 6, and looking in the direction of the arrows.

In the transmission embodiment 50 shown in FIGS. 6 and 7, an endless belt 52 is formed to include a stiff center core 54 extending a predetermined amount beyond the sides of the belt 52. First and second spaced sets of cylindrical positioning wheels or pulleys 56/58 and 60/62, respectively, disposed adjacent opposite edges of the belt 52 and pivotally interconnected by respective sets of parallel linkage members 64 and 66, are employed, but in this embodiment, they straddle the center core 54, rather than the belt 52.

Now, assuming a belt 52 thickness of 1 unit and a radius of 1 unit for each of the drive and driven pulleys 68 and 70, movement of the actuating lever 72 secured by pivot pins 74 and 76 to the respective linkage members 64 and 66, via the yoke 78 and the actuating mechanism 80 exerts a bending force on the center core 54 which, in turn, urges the belt 52 to engage one of the drive or driven pulleys 68 or 70 over a progressively increasing area to accomplish the same result as explained above relative to the FIGS. 1–5 embodiment.

It should be apparent that the invention provides a simplified, compact, lightweight, economical, and effective continuously variable transmission and that the overall speed ratio range may be varied from the 1:2 and 2:1 limits described above, depending upon the relative dimensions of belt thickness and drive and driven pulley radii selected.

It should also be apparent that the speed ratio limits selected in the above description, i.e., 1:2 to 2:1, would emcompass the FIRST to THIRD or FOURTH gearshift range of most present day smaller vehicles, if the transmission 10 were used in lieu of a conventional synchromesh or automatic transmission by virtue of the drive shaft 13 and the driven shaft 15 being operatively connected to the conventional engine output shaft and prop shaft, respectively. No clutch or reverse mechanisms have been shown or described as any known concept may be utilized for declutching, or for reversing the direction of rotation relative to the shaft 15.

It should also be noted that a chain link type belt whose links are pivotable at the centers thereof could be utilized in lieu of elastomeric or flexible linked rigid material.

Additionally, it is also apparent that the constant length of a selected belt could be along the inner or outer surface thereof, rather than the center length indicated above, in the event a continuously variable speed ratio is desired in only one direction from the 1:1 ratio condition of FIG. 2, for a particular application.

While but two embodiments of the invention have been shown and described, other modifications thereof are possible.

What is claimed is:

1. A transmission comprising a cylindrical drive pulley, a cylindrical driven pulley, an endless belt of a suitable material and a predetermined uniform thickness, said belt being frictionally confined between said drive and driven pulleys and loosely encompassing one of said pulleys, an inner pair of cylindrical positioning pulleys mounted toward the inside of said endless belt on opposite sides of said one of said pulleys, an outer pair of cylindrical positioning pulleys mounted toward the outside of said endless belt on opposite sides of the other of said drive and driven pulleys, each of said inner and outer pairs of positioning pulleys frictionally confining a portion of said endless belt, and means for moving said positioning pulleys inwardly or outwardly so as to cause said endless belt to bend partially around one of said drive and driven pulleys such that the inner and outer surfaces of said belt become respectively alternately variably shortened or lengthened to thereby cause said inner and outer surfaces to travel different distances and, hence, different speeds for infinitely varying the resultant speed ratio between said drive and driven pulleys between predetermined limits, depending upon the relative dimensions of said drive and driven pulleys radii and said belt thickness.

2. A transmission comprising a cylindrical drive pulley, a cylindrical driven pulley, an endless belt of a suitable material and a predetermined uniform thickness, said belt being frictionally confined between said drive and driven pulleys and loosely encompassing one of said pulleys, an inner pair of cylindrical positioning pulleys mounted within said endless belt on opposite sides of said one of said pulleys, an outer pair of cylindrical positioning pulleys mounted on the outside of said endless belt on opposite sides of the other of said drive and driven pulleys, each of said inner and outer pairs of positioning pulleys frictionally confining said endless belt, linkage means connected between and rotatably supporting respective oppositely disposed inner and outer positioning pulleys for retaining the line between the centers thereof perpendicular to the adjacent inner and outer surfaces of said endless belt during all operational positions thereof, and actuating means pivotally supporting said linkage means for selectively moving said pairs of positioning pulleys inwardly or outwardly with respect to the interior of said endless belt so as to cause said endless belt to bend partially around one of said drive and driven pulleys such that the inner and outer surfaces of said belt become respectively alternately shortened and lengthened such that the intersection of lines encompassing the arc lengths of said shortened and lengthened surfaces progressively changes from infinity to the center of said one of said drive and driven pulleys for infinitely varying the resultant speed ratio between said drive and driven pulleys between predetermined limits, depending upon the relative dimensions of said drive and driven pulleys radii and said belt thickness.

3. A transmission comprising a cylindrical drive pulley, a cylindrical driven pulley, an endless belt of a suitable material and a predetermined uniform thickness, said belt being frictionally confined between said drive and driven pulleys and loosely encompassing one of said pulleys, an inner pair of cylindrical positioning pulleys mounted within said endless belt on opposite sides of said drive pulley, an outer pair of cylindrical positioning pulleys mounted on the outside of said endless belt on opposite sides of said driven pulley, each of said inner and outer pairs of positioning pulleys frictionally confining said endless belt, linkage means connected between and rotatably supporting respective oppositely disposed inner and outer positioning pulleys for retaining the line between the centers thereof perpendicular to the adjacent inner and outer surfaces of said endless belt during all operational positions thereof, and actuating means pivotally supporting said linkage means for selectively moving said pairs of positioning pulleys inwardly or outwardly with respect to the interior of said endless belt so as to cause said endless belt to bend partially around said drive pulley such that the inner and outer surfaces of said belt become respectively shortened and lengthened for overdrive and to cause said endless belt to bend partially around said driven pulley such that the inner and outer surfaces of said belt become respectively lengthened and shortened for underdrive, thereby infinitely varying the resultant speed ratio between said drive and driven pulleys between predetermined limits.

4. A transmission comprising a cylindrical drive pulley, a cylindrical driven pulley, an endless belt of a suitable material and a predetermined uniform thickness and including a flexible center core extending beyond both side walls thereof, said belt being frictionally confined between said drive and driven pulleys and loosely encompassing one of said pulleys, an inner pair of cylindrical positioning pulleys mounted toward the inside of said endless belt on opposite sides of said one of said pulleys, an outer pair of cylindrical positioning pulleys mounted toward the outside of said endless belt on opposite sides of the other of said drive and driven pulleys, each of said inner and outer pairs of positioning pulleys frictionally confining said flexible center core, linkage means connected between and rotatably supporting respective oppositely disposed inner and outer positioning pulleys for retaining the line between the centers thereof perpendicular to the adjacent inner and outer surfaces of said flexible center core during all operational positions thereof, and actuating means pivotally supporting said linkage means for selectively moving said pairs of positioning pulleys inwardly or outwardly with respect to the interior of said endless belt so as to cause said endless belt to bend partially around one of said drive and driven pulleys such that the inner and outer surfaces of said belt become respectively alternately shortened and lengthened such that the intersection of lines encompassing the arc lengths of said shortened and lengthened surfaces progressively changes from infinity to the center of said one of said drive and driven pulleys for infinitely varying the resultant speed ratio between said drive and driven pulleys between predetermined limits, depending upon the relative dimensions of said drive and driven pulleys radii and said belt thickness.

* * * * *